Nov. 3, 1970 W. OTT 3,537,829
DEVICE FOR REDUCING THE CONTENT OF CARBON MONOXIDE IN THE EXHAUST GASES FROM AN INTERNAL COMBUSTION ENGINE
Filed May 15, 1967

INVENTOR.
WALTER OTT
BY
Woodhams, Blanchard & Flynn
ATTORNEYS

United States Patent Office 3,537,829
Patented Nov. 3, 1970

3,537,829
DEVICE FOR REDUCING THE CONTENT OF CARBON MONOXIDE IN THE EXHAUST GASES FROM AN INTERNAL COMBUSTION ENGINE
Walter Ott, Wetzikon, Switzerland, assignor to Hivag Handels- und Industrie-Verwaltungs A.G., Vaduz, Liechtenstein
Filed May 15, 1967, Ser. No. 638,509
Claims priority, application Switzerland, May 24, 1966, 7,800/66
Int. Cl. B01f 5/00; F02m 23/04, 25/02
U.S. Cl. 48—180                              12 Claims

ABSTRACT OF THE DISCLOSURE

A device disposed between a fuel-air mixture supply means and the intake of an internal combustion engine for causing more complete fuel combustion whereby the carbon monoxide content of the engine exhaust gases is reduced. The device includes a cyclone chamber having a mesh screen member extending thereacross and dividing the chamber into first and second subchambers. A mixture intake communicates with the first subchamber and a mixture outlet communicates with the second subchamber. The mixture intake is positioned at an acute angle relative to the surface of the screen member and is additionally positioned substantially tangentially relative to the chamber whereby the fuel-air mixture supplied to the chamber undergoes a swirling motion.

---

The present invention relates to a device for reducing the content of carbon monoxide in the exhaust gases from internal-combustion engines.

Numerous devices of this kind have been proposed. The aim of all of them is to reduce the carbon monoxide content of the exhaust of internal-combustion engines. The success achieved by them is somewhat modest in relation to the cost of construction involved, for which reason these previously proposed devices have hitherto not found wide acceptance. The comparatively high price of the devices has also stood in the way of their general introduction.

According to the present invention there is provided a device for reducing the carbon monoxide content of exhaust gases of an internal-combustion engine, comprising gas-flow defining means interposed between the fuel induction manifold of the engine and a fuel-atomising device and a gauze having a mesh size of 1 mm. at most, fitted within the gas-flow directing means substantially at right angles to the flow passage through the latter.

The mesh of the gauze should preferably measure less than 0.5 mm., but the total cross-sectional area of free passage through the gauze should be at least as large as that of the inlet or outlet passage of the gas-flow defining means.

The fine-meshed gauze produces a finer subdivision of the fuel droplets before their admission to the engine and results in more intimate mixing with the oxygen-containing air. The combustion of the hydrocarbon fuel is therefore more complete and this brings about a reduction in the content of carbon monoxide in the exhaust gases and an improvement in engine performance.

Figure 1:
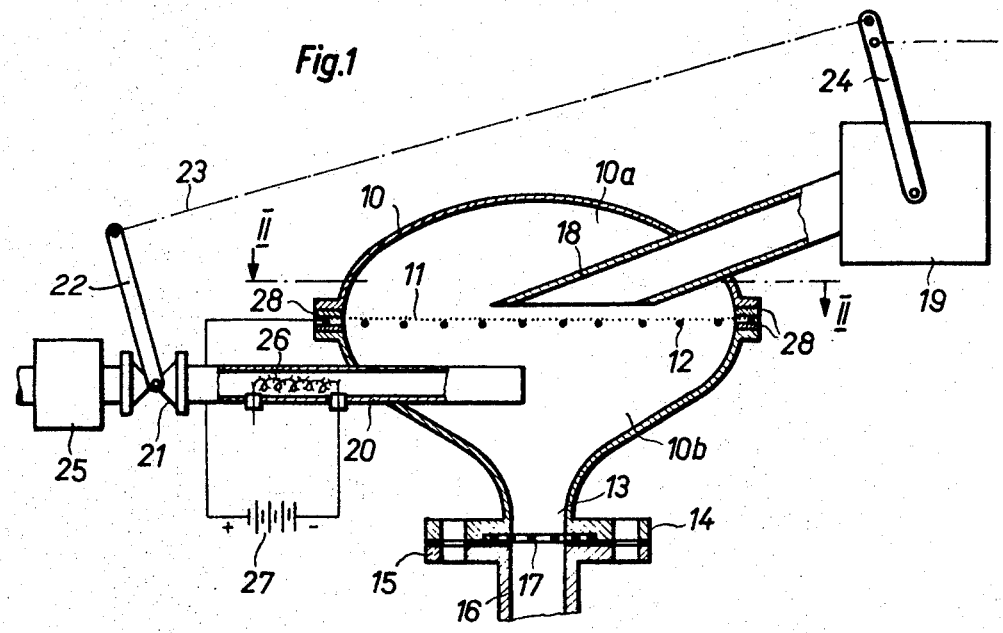
Figure 2:
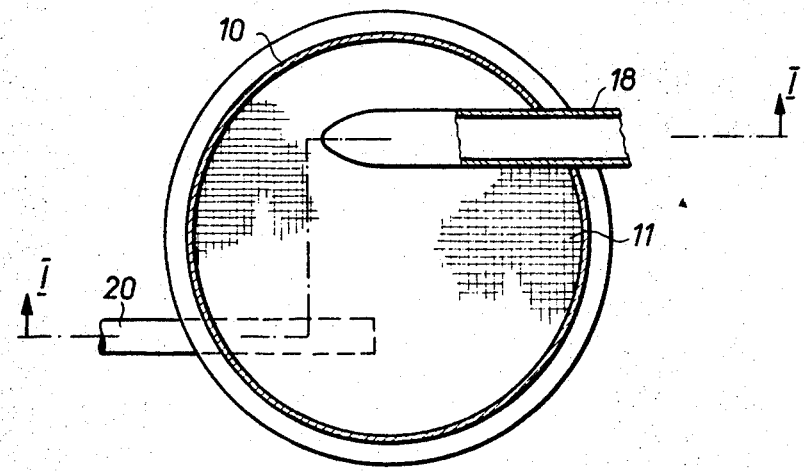

An embodiment of a device for reducing the carbon monoxide content of exhaust gases in accordance with the invention will now be described, by way of example, with reference to the accompanying diagrammatic drawings, in which:

FIG. 1 is a side view of the device, partly in elevation and partly in the form of a section along the line I—I in FIG. 2; and FIG. 2 is a section at right angles to the above, along the line II—II in FIG. 1.

The device illustrated has a cyclone or turbulence chamber 10, the symmetrical form of which is generated by rotation about an axis. The chamber 10 is divided into two spaces 10a and 10b, by a fine gauze 11, backed by a supporting grid 12, of considerably coarser mesh. The gauze 11 and grid 12 lie in a plane at right angles to the axis of symmetry of the chamber 10. The mesh size of the gauze 11 is less than 1 mm. and preferably even smaller than 0.5 mm. This gauze 11 may be woven, for example, from fine metal wire having a gauge of from 0.1 to 0.2 mm. The grid 12 serves only as a support for the fine gauze 11.

The lower space 10b, in FIG. 1 narrows into a funnel leading to an outlet passage 13, surrounded by a securing flange 14. This flange is fixed by means of bolts (not shown) to the flange 15 of the induction manifold 16 of an internal-combustion engine (likewise not shown). Across the outlet passage 13, a metal gauze, 17, is fitted as a precaution against burn-back.

Opening into the upper space 10a of the chamber 10 is a fuel-air mixture supply or intake pipe 18, the longitudinal centre line of which should preferably be inclined at an angle of about 20° to the plane in which the gauze 11 lies. This intake pipe, moreover, is so arranged that its longitudinal centre line, when seen in projection as in FIG. 2, runs to some extent tangentially to the chamber 10, that is, the discharge opening of the pipe 18 is laterally offset radially relative to the axis of the chamber 10, and the longitudinal center line of the pipe 18 is disposed substantially perpendicular to a radial line joining the axis of the chamber and the discharge opening of the pipe. The intake pipe 18 is connected to a device (shown diagrammatically at 19 in FIG. 1) for the production of the fuel mist (that is the fuel-air mixture), such as a carburetor, an injection pump or the like.

The cyclone chamber 10 and the intake pipe 18 together form a gas-flow defining means between the fuel mist-producing device 19 and the engine induction manifold 16, the fine gauze 11 being so placed within this member that the mist of fuel must pass through the gauze. The total cross-sectional area of free passage through the meshes of the gauze 11 is at least as large as that of the intake pipe 18 or of the outlet 13. The supporting grid 12 lies at that side of the gauze 11 which faces towards the outlet 13.

The mode of operation of the device described above is as follows:

The mist of fuel coming from the carburetor or injection pump 19 meets the fine gauze 11 obliquely, so that only the smallest of the fuel droplets can pass unhindered through the meshes of the gauze. All the other droplets are further subdivided by the fine wires of the gauze. Moreover, because of the tangential position of the intake pipe 18, a cyclonic swirling motion is imparted to the fuel mist within the chamber 10, which not only enhances the subdividing action of the gauze 11, but also brings about more intimate mixing of the fuel droplets with the oxygen-containing combustion air likewise entering through the pipe 18. This thorough mixing takes place mainly in the lower space 10b of the chamber, in which the extremely finely divided droplets of fuel are uniformly distributed throughout the air and are vaporised to a large extent. The intimate mixture of fuel and air is passed in a cyclonic swirl through the funnel-shaped constriction of the chamber 10 to the induction manifold 16 of the internal-combustion engine.

Obviously, the finer atomisation and actual vaporisation of the fuel and the more intimate mixing of the fuel with the air must result in more complete combustion within the engine than has been the case hitherto.

This gives rise not only to improved engine performance, but also to a very considerable reduction in the amount of carbon monoxide contained in the exhaust gases. Practical tests with a production-model four-stroke Otto-cycle engine of 1,200 cc. cylinder capacity showed the combustion efficiency to have been increased from 74% to 83.5% at 2,000 revolutions per minute. The content of carbon monoxide in the exhaust was approximately 0.6% by volume at 750 r.p.m. (idling speed), less than 0.1% by volume at 2,000 r.p.m. and between 0.5% and 0.9% by volume at the maximum obtainable speed of 4,300 r.p.m. These values of carbon monoxide content are far below those found in the exhaust gases from conventional production-model internal combustion engines. It is particularly noteworthy that the invention device described enables the carbon monoxide content to be kept well below 1% by volume throughout the entire speed range, which is not the case with devices known hitherto and fitted on the exhaust side.

A still larger reduction in carbon monoxide content and improvement in combustion efficiency can be achieved by the following additional measure:

A second intake pipe 20, likewise substantially tangential, opens into the space 10b of the cyclone chamber 10, as clearly shown in FIG. 2. This intake pipe 20 is fitted with a flow-control regulator 21, operated by a member 22, coupled by a link respresented diagrammatically at 23 in FIG. 1 to the throttle control lever 24 on the carburetor or its equivalent 19. While the engine is idling, the regulator 21 is closed; the more the engine power output is increased by means of the lever 24, the wider the regulator 21 is opened. In the simplest case, the regulator 21 may be open to the atmosphere or connected to a small compressor on the side remote from the chamber 10. The inflow of air through the pipe 20, when the engine is speeded-up, further improves the engine efficiency and further reduces the carbon monoxide content of the exhaust gases.

However, there is particular advantage is fitting to the upstream side of the regulator 21 an auxiliary device 25, for the production of water vapour, and in feeding the latter in an ionised condition into the space 10b. Ionisation may be effected, for example, by means of an electrode 26, with projecting points, fitted within but insulated from the intake pipe 20 and connected to the negative terminal of a source of electric current 27. The electrode 26 may be in the form of a cylindrical brush made of metal wire. The positive terminal of the current source 27 should preferably be connected to the fine gauze 11, insulating rings 28 being used to insulate the gauze electrically from the cyclone chamber 10. If desired, the whole of the cyclone chamber 10 may consist of such insulating material.

The further mode of operation of the invention, in the modified form just described, is as follows:

The water molecules in the water vapour produced in the auxiliary device 25 are negatively charged by the electrode 26 on their way into the cyclone chamber 10, while the fine droplets or molecules of vapour in the fuel received a positive charge in passing through the gauze 11. In the course of the mixing action in the space 10b, a negatively charged water particle or molecule is attached by electrostatic attraction to each positively charged particle of fuel. As the combustion temperature of petrol, for example, right at the heart of the explosion, is about 2,500° C., the water particle is broken down into its constituent atoms of hydrogen and oxygen. This process, in itself endothermic, is followed at once by the exothermic combination of hydrogen and oxygen, causing the surrounding air particles to expand and exert an additional driving force on the pistons of the engine. In this way, a "fractionated" detonating-gas explosion is achieved which, because of the division into countless individual explosions, is not destructive in its action on the material in the containing walls. As low a voltage as 6 volts may be sufficient in some circumstances for electrically charging the water and fuel particles as described, although better results are obtained from higher voltages.

The ionising equipment illustrated may still have a certain beneficial effect if the vapour producer 25 be omitted and air alone be admitted to the admission pipe 20. In that case, the air particles will receive the negative charge and be attached by electrostatic attraction to the positively charged fuel particles.

The water-vapour or air ionisation described is appropriate and effective only when the fuel is broken down into tiny particles of almost molecular size, as can be achieved with the aid of the gauze 11. The shape of the cyclone chamber 10 is not of decisive importance, but sharp edges, flats and projections should be avoided for reasons of flow technology. In the test arrangement shown in FIGS. 1 and 2, the chamber 10 is about 12 cm. in diameter.

The device described for reducing the carbon monoxide content of exhaust gases can naturally be applied in conjunction with already existing devices fitted on the exhaust side, such as special vortex silencers or afterburners. This will naturally produce a further reduction in the carbon monoxide content.

I claim:

1. A device adapted to be disposed between a fuel-air mixture supply means and the intake of an internal combustion engine for promoting a more complete fuel combustion whereby the carbon monoxide content of the engine exhaust gases is reduced, comprising:

housing means defining therein a cyclone chamber which is rotationally symmetrical about an axis thereof;

a fine-mesh screen member positioned within and extending across said chamber for dividing same into a pair of subchambers;

inlet means communicating with one of said subchambers for supplying said fuel-air mixture thereto, said inlet means being positioned and oriented so that the fuel-air mixture is supplied to said one subchamber at an acute angle relative to the adjacent surface of the screen member and substantially tangentially relative to said chamber whereby the fuel-air mixture undergoes a swirling motion within said subchamber, and outlet means communicating with said other subchember for supplying said fuel-air mixture, after it has passed through the screen member, to the internal combustion engine.

2. A device according to claim 1, wherein said other subchamber as defined by said housing means includes a smooth funnel-like portion which converges in the direction of fuel-air mixture flow therethrough with the discharge end of said funnel-like portion defining said outlet means.

3. A device according to claim 2, further including second inlet means in direct communication with said other subchamber for supplying a further fluid thereto for increasing the fuel combustion efficiency, said second inlet means providing for flow of said fluid into said other subchamber substantially tangentially thereof, regulating means connected to said second inlet means for regulating the flow of said fluid into said other subchamber, an electrical voltage source and means electrically connecting said source to said screen member whereby said screen member comprises a first electrode, said screen member being electrically insulated from said housing means, and a second electrode electrically connected to said source and arranged in said second inlet means, said screen member and said second electrode being connected to the opposite terminals of said voltage source.

4. A device according to claim 1, further including second inlet means in direct communication with said other subchamber for supplying a further fluid thereto for increasing the fuel combustion efficiency, said second inlet means providing for flow of said fluid into said other subchamber substantially tangentially thereof, and regulating means connected to said second inlet means for regulating the flow of said fluid into said other subchamber.

5. A device according to claim 4, wherein a water vapor producing means is connected to said second inlet means.

6. A device according to claim 4, further including an electrical voltage source and means electrically connecting said source to said screen member whereby said screen member comprises a first electrode, said screen member being electrically insulated from said housing means, and a second electrode electrically connected to said source and arranged in said second inlet means, said screen member and said second electrode being connected to the opposite terminals of said voltage source.

7. A device according to claim 1, wherein said inlet means includes a pipe-like member which extends through said housing means into said one subchamber to a position close to said screen member.

8. A device according to claim 7, wherein said pipe-like member is provided with a discharge opening at its free end, the free end of said pipe-like member being cut obliquely relative to the longitudinal axis of the pipe-like member whereby the discharge opening lies within a plane which extends at an oblique angle relative to the longitudinal direction of the pipe-like member and is substantially parallel to the screen member.

9. A device according to claim 8, wherein said other subchamber as defined by said housing means includes a smooth funnel-like portion which converges in the direction of fuel-air mixture flow therethrough, the discharge end of said funnel-like portion defining said outlet means.

10. A device according to claim 1, wherein said one chamber has a cross-sectional area perpendicular to said axis substantially greater than the cross-sectional area of the intake to the internal combustion engine.

11. A device according to claim 10, wherein said screen member is substantially perpendicular to said axis, and said inlet means being inclined at an angle of approximately 20 degrees relative to the plane of said screen member whereby the fuel-air mixture supplied to said chamber undergoes a swirling motion as it moves longitudinally of said chamber from said one subchamber through said screen member into said other subchamber.

12. A device according to claim 11, wherein said other subchamber has a smooth funnel-like portion which converges in a direction from the screen member to the outlet means, said outlet means including an outlet opening defined by said housing means and being disposed in a plane which is substantially parallel to and laterally displaced from said screen member.

References Cited
UNITED STATES PATENTS

| | | | |
|---|---|---|---|
| 1,253,266 | 1/1918 | Melton | 43—180 |
| 1,282,431 | 10/1918 | Josephson. | |
| 1,333,838 | 3/1920 | Csanyi. | |
| 1,394,820 | 10/1921 | Fritz. | |
| 1,545,649 | 7/1925 | Fowler. | |
| 1,663,507 | 3/1928 | Parsons | 48—180 |
| 1,771,626 | 7/1930 | Hamilton. | |
| 2,645,466 | 7/1953 | Jones. | |
| 2,701,557 | 2/1955 | Ramey | 48—180 X |
| 2,705,941 | 4/1955 | Unschuld. | |
| 3,110,294 | 11/1963 | Nyman. | |

MORRIS O. WOLK, Primary Examiner

B. S. RICHMAN, Assistant Examiner

U.S. Cl. X.R.

123—119; 261—1